United States Patent
Lee et al.

(10) Patent No.: US 12,242,360 B2
(45) Date of Patent: Mar. 4, 2025

(54) METHOD AND APPARATUS FOR PERFORMING DATA ACCESS MANAGEMENT OF MEMORY DEVICE IN PREDETERMINED COMMUNICATIONS ARCHITECTURE TO ENHANCE SUDDEN POWER OFF RECOVERY OF PAGE-GROUP-BASED REDUNDANT ARRAY OF INDEPENDENT DISKS PROTECTION WITH AID OF SUSPENDIBLE SERIAL NUMBER

(71) Applicant: Silicon Motion, Inc., Hsinchu County (TW)

(72) Inventors: Jie-Hao Lee, Hsinchu County (TW); Chun-Ju Chen, Taichung (TW); Po-Ting Chen, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 75 days.

(21) Appl. No.: 18/202,297

(22) Filed: May 26, 2023

(65) Prior Publication Data

US 2024/0394155 A1    Nov. 28, 2024

(51) Int. Cl.
*G06F 11/16* (2006.01)
*G06F 1/30* (2006.01)
*G06F 11/14* (2006.01)

(52) U.S. Cl.
CPC ............ *G06F 11/1662* (2013.01); *G06F 1/30* (2013.01); *G06F 11/1435* (2013.01)

(58) Field of Classification Search
CPC ............ G06F 11/1662; G06F 11/1658; G06F 11/1435; G06F 11/1441; G06F 1/30
See application file for complete search history.

(56) References Cited

U.S. PATENT DOCUMENTS

| | | | | |
|---|---|---|---|---|
| 6,104,638 A * | 8/2000 | Larner | ................. | G11C 16/102 |
| | | | | 714/E11.135 |
| 7,053,470 B1 * | 5/2006 | Sellers | ................. | G11C 29/802 |
| | | | | 257/723 |

(Continued)

FOREIGN PATENT DOCUMENTS

| | | | |
|---|---|---|---|
| TW | 202018495 A | | 5/2020 |
| TW | 202145004 A | | 12/2021 |

(Continued)

*Primary Examiner* — Joseph O Schell
(74) *Attorney, Agent, or Firm* — Winston Hsu

(57) ABSTRACT

A method for performing data access management of a memory device in predetermined communications architecture to enhance sudden power off recovery (SPOR) of page-group-based redundant array of independent disks (RAID) protection with aid of suspendible serial number and associated apparatus are provided. The method may include: utilizing the memory controller to write preceding data and metadata thereof into at least one set of preceding pages in a first active block to make the metadata carry at least one preceding serial number; writing dummy data and other metadata into at least one set of dummy pages in the first active block to make the other metadata carry at least one suspended serial number which is equal to a last serial number among the at least one preceding serial number; and utilizing the memory controller to write subsequent data and metadata thereof to make it carry at least one subsequent serial number.

14 Claims, 7 Drawing Sheets

(56) References Cited

U.S. PATENT DOCUMENTS

| | | | |
|---|---|---|---|
| 2004/0193786 A1* | 9/2004 | Inagaki | G06F 12/0246 |
| | | | 711/E12.008 |
| 2008/0244585 A1 | 10/2008 | Candea | |
| 2015/0186224 A1* | 7/2015 | Lin | G11C 11/56 |
| | | | 714/6.12 |
| 2015/0370493 A1* | 12/2015 | Choi | G06F 3/0659 |
| | | | 711/103 |
| 2016/0216907 A1* | 7/2016 | Chang | G06F 3/0656 |
| 2018/0373433 A1* | 12/2018 | Ke | G06F 12/0292 |
| 2019/0205250 A1* | 7/2019 | Fang | G06F 9/445 |
| 2020/0042181 A1* | 2/2020 | Lee | G06F 3/0616 |
| 2022/0011946 A1 | 1/2022 | Bernat | |

FOREIGN PATENT DOCUMENTS

| | | | |
|---|---|---|---|
| TW | 202145243 A | 12/2021 | |
| TW | 202232329 A | 8/2022 | |

* cited by examiner

METHOD AND APPARATUS FOR PERFORMING DATA ACCESS MANAGEMENT OF MEMORY DEVICE IN PREDETERMINED COMMUNICATIONS ARCHITECTURE TO ENHANCE SUDDEN POWER OFF RECOVERY OF PAGE-GROUP-BASED REDUNDANT ARRAY OF INDEPENDENT DISKS PROTECTION WITH AID OF SUSPENDIBLE SERIAL NUMBER

BACKGROUND OF THE INVENTION

1. Field of the Invention

The present invention is related to memory control, and more particularly, to a method and apparatus for performing data access management of a memory device in a predetermined communications architecture to enhance sudden power off recovery (SPOR) of page-group-based redundant array of independent disks (RAID) protection with aid of suspendible serial number.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. As some files may be frequently accessed, some data may become invalid data, and it may be needed to release more storage space for further use. During accessing of the files, internal management information may change correspondingly. There may be multiple types of internal management information. When a sudden power off SPO event occurs, associated processing may be time consuming. For example, in a situation where the memory device is equipped with a certain type of RAID protection mechanism, the total processing time may be increased. It seems that there is no proper suggestion in the related art. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access management of a memory device in a predetermined communications architecture (e.g., a UFS communications architecture) to enhance SPOR of page-group-based RAID protection with aid of suspendible serial number, in order to solve the above-mentioned problems.

At least one embodiment of the present invention provides a method for performing data access management of a memory device in a predetermined communications architecture to enhance SPOR of page-group-based RAID protection with aid of suspendible serial number, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: before occurrence of a sudden power off (SPO) event, utilizing the memory controller to write preceding data and metadata of the preceding data into at least one set of preceding pages in a first active block among the plurality of blocks to make the metadata in the at least one set of preceding pages carry at least one preceding serial number; and after occurrence of the SPO event, utilizing the memory controller to perform a SPOR procedure in response to the SPO event. For example, the SPOR procedure may comprise: determining a beginning location of a damaged page group; and writing dummy data and other metadata into at least one set of dummy pages in the first active block to make the other metadata carry a suspended serial number which is equal to a last serial number among the at least one preceding serial number, for indicating that RAID encoding of the at least one set of dummy pages in the damaged page group should be skipped, wherein the damaged page group comprises the at least one set of preceding pages. The method may further comprise: after performing the SPOR procedure in response to the SPO event, utilizing the memory controller to write subsequent data and metadata of the subsequent data into at least one set of subsequent pages in the damaged page group to make the metadata in the at least one set of subsequent pages carry at least one subsequent serial number, wherein each serial number among the at least one subsequent serial number is different from the last serial number among the at least one preceding serial number.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform data access management of the memory device in a predetermined communications architecture to enhance SPOR of page-group-based RAID protection with aid of suspendible serial number. For example, before occurrence of a sudden power off (SPO) event, the memory controller writes preceding data and metadata of the preceding data into at least one set of preceding pages in a first active block among the plurality of blocks to make the metadata in the at least one set of preceding pages carry at least one preceding serial number; and after occurrence of the SPO event, the memory controller performs a SPOR procedure in response to the SPO event. For example, the SPOR procedure may comprise: determining a beginning location of a damaged page group; and writing dummy data and other metadata into at least one set of dummy pages in the first active block to make the other metadata carry at least one suspended serial number which is equal to a last serial number among the at least one preceding serial number, for indicating that RAID encoding of the at least one set of dummy pages in the damaged page group should be skipped, wherein the damaged page group comprises the at least one set of preceding pages. Additionally, after performing the SPOR procedure in response to the SPO event, the memory controller writes subsequent data and metadata of the subsequent data into at least one set of subsequent pages in the damaged page group to make the metadata in the at least one set of subsequent pages carry at least one subsequent serial number, wherein each serial number among the at least one subsequent serial number is different from the last serial number among the at least one preceding serial number.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In order to correct the related art problems, it is suggested that the memory device may operate according to at least one control scheme (e.g., one or more control schemes) of the method to perform associated operations, and more particularly, execute multiple procedures of the method to perform associated control using the suspendible serial number, to enhance overall performance.

The present invention method and apparatus can guarantee that the memory device can operate properly in various situations. For example, the memory controller may perform the SPOR procedure in response to the SPO event, and more particularly, suspend the change of serial number during processing the dummy pages in the SPOR procedure, for indicating that RAID encoding of the dummy pages in the damaged page group should be skipped. The memory controller may refer to the suspendible serial number to perform other procedures such as a RAID decoding procedure, to guarantee correctness of the data, decrease the total processing time of associated processing and enhance overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
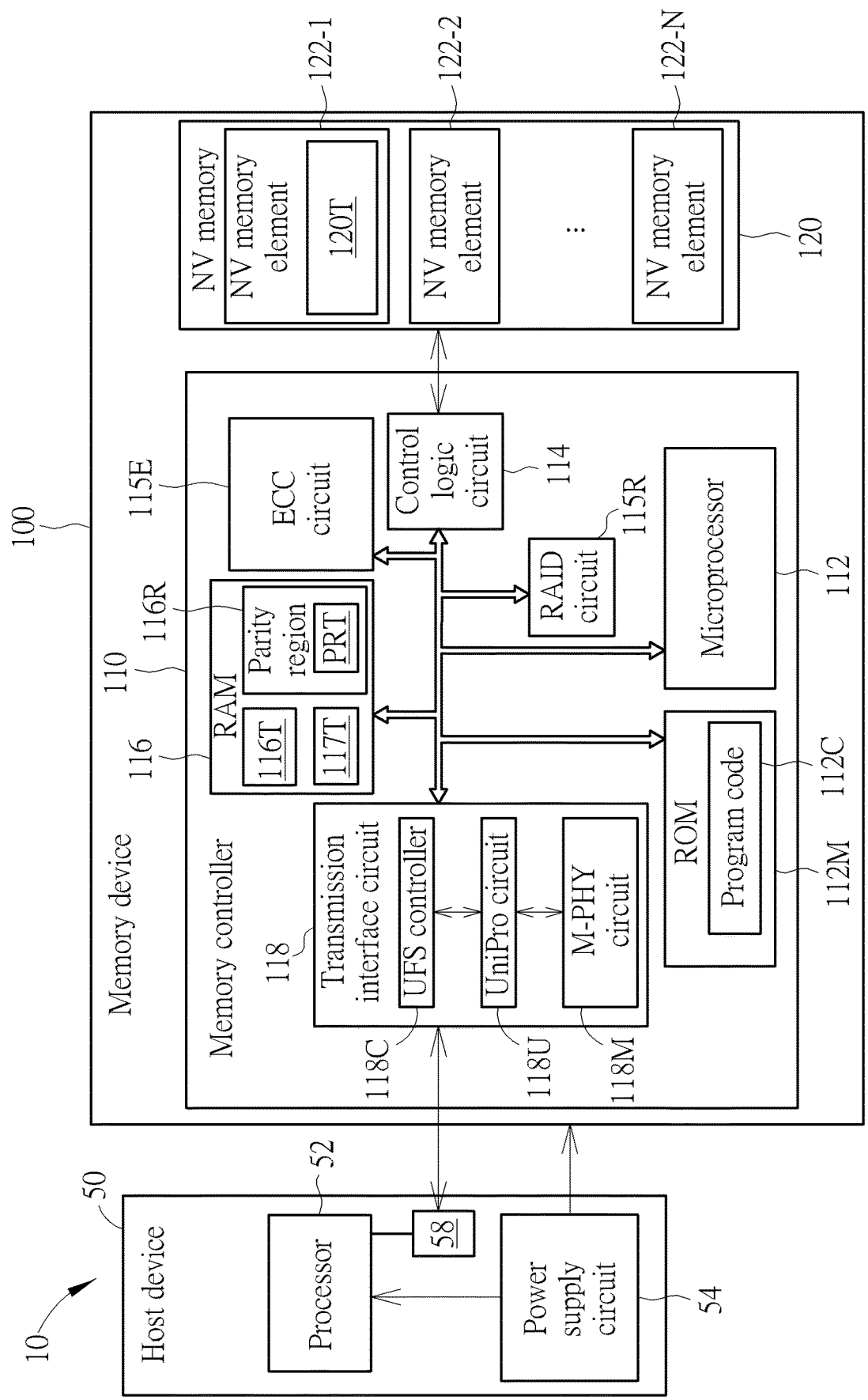
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, an error correction code (ECC)

circuit 115E, a RAID circuit 115R, a Random Access Memory (RAM) 116, and a transmission interface circuit 118, where at least one portion (e.g., a portion or all) of the above components may be coupled to one another via a bus. The RAM 116 may be arranged to provide the memory controller 110 with internal storage space (for example, may temporarily store information), where the RAM 116 may be implemented by way of Static Random Access Memory (SRAM), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The ECC circuit 115E may perform ECC encoding and ECC decoding, in order to protect data and/or perform error correction for any sub-storage-unit of multiple sub-storage-units within a physical page, and the size of each of the multiple sub-storage-units may be equal to a predetermined size. The RAID circuit 115R may perform RAID encoding and RAID decoding, in order to protect data and/or perform error correction for a physical page group. The transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) (specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update at least one physical-to-logical (P2L) address mapping table such as a temporary P2L address mapping table 117T. For example, when there is a need, the memory controller 110 may refer to the temporary P2L address mapping table 117T to perform some internal management operations such as GC operations, etc.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the plurality of local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table (e.g., a first local L2P address mapping table) among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

The memory region of the RAM 116 may comprise multiple sub-regions for temporarily storing various information such as buffered data, the temporary L2P address mapping table 116T, the temporary P2L address mapping table 117T, etc., and at least one portion of sub-regions (e.g., a portion of sub-regions or all sub-regions) among the multiple sub-regions of the memory region may be regarded as a data buffer. For example, the sub-region for temporarily storing the buffered data may be regarded as the data buffer, but the present invention is not limited thereto. According to some embodiments, the whole of the memory region, such as the multiple sub-regions for temporarily storing the buffered data, the temporary L2P address mapping table 116T, the temporary P2L address mapping table 117T, etc., may be regarded as the data buffer.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, N]) within the NV memory elements 122-1, 122-2, . . . , and 122-N may comprise multiple blocks, and a block among the multiple blocks may comprise and record a specific number of pages, where the memory controller 110 may access a certain page of a certain block among the multiple blocks according to a block address and a page address.

According to some embodiments, the memory controller 110 may monitor valid page counts of at least one portion (e.g., a portion or all) of the plurality of blocks, respectively, for subsequent processing such as the GC operations. Regarding data reception, the memory controller 110 may configure at least one block (e.g., one or more blocks) among the plurality of blocks of the aforementioned at least one NV memory element (e.g., the one or more NV memory elements such as {122-1, 122-2, ..., 122-N}) in the NV memory 120 to be at least one active block (e.g., one or more active blocks), and utilize the aforementioned at least one active block to receive and store data from the host device 50, such as host-write data. For example, the data such as the host-write data (e.g., the data to be written into the NV memory 120) may comprise a plurality of sets of partial data, and the aforementioned at least one active block may comprise a first active block, where the temporary P2L address mapping table 117T may correspond to the first active block, and more particularly, store the associated mapping information for indicating P2L address mapping relationships regarding the first active block. In addition, the memory controller 110 may maintain (e.g., generate or update) the temporary P2L address mapping table 117T, in order to perform the associated internal management.

Figure 2:
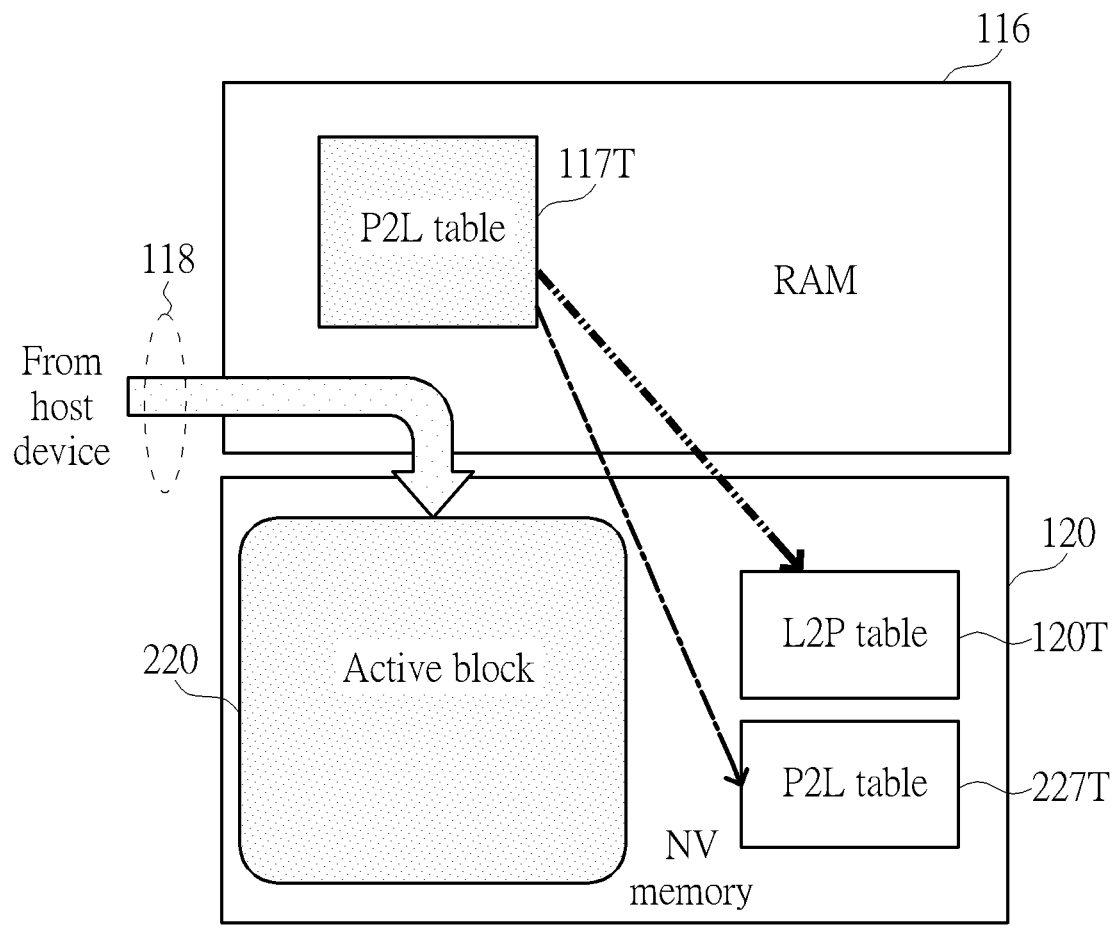
FIG. 2 illustrates a table processing control scheme according to an embodiment of the present invention.

FIG. 2 illustrates a table processing control scheme according to an embodiment of the present invention. During receiving and storing the data such as the host-write data (e.g., the data to be written into the NV memory 120) from the host device 50, the memory controller 110 may utilize the first active block such as an active block 220 to receive and store one or more sets of partial data among the plurality of sets of partial data, and record the associated mapping information such as P2L table entries into the temporary P2L address mapping table 117T (labeled "P2L table" for brevity) corresponding to the active block 220, for indicating the P2L address mapping relationships regarding the active block 220. The P2L address mapping relationships indicated by the P2L table entries may comprise the P2L address mapping relationships between the logical addresses at which the one or more sets of partial data are written by the host device 50 and the physical addresses indicating the locations where the one or more sets of partial data are stored in the active block 220. When a first predetermined criterion (e.g., the active block 220 is fully programmed, or a predetermined number of pages of the active block 220 is programmed) is met, the memory controller 110 may perform a set of table processing operations, and the set of table processing operations may comprise:

(1) a first table processing operation: updating the global L2P address mapping table 120T (labeled "L2P table" for brevity) according to the temporary P2L address mapping table 117T (labeled "P2L table" for brevity) corresponding to the active block 220, and more particularly, updating some L2P table entries (labeled "L2P entries" for brevity) in the global L2P address mapping table 120T according to the P2L table entries (labeled "P2L entries" for brevity) in the temporary P2L address mapping table 117T, for indicating L2P address mapping relationships regarding the active block 220;

(2) a second table processing operation: storing the temporary P2L address mapping table 117T (e.g., the P2L table entries therein) into the NV memory 120 to generate or update a first P2L address mapping table such as a P2L address mapping table 227T (labeled "P2L table" for brevity), for example, by writing all P2L table entries recorded in the temporary P2L address mapping table 117T into the P2L address mapping table 227T, for performing the subsequent processing mentioned above, where the P2L address mapping table 227T may be regarded as a backup version of the temporary P2L address mapping table 117T; and (3) a third table processing operation: after performing the first table processing operation (e.g., updating the global L2P address mapping table 120T according to the temporary P2L address mapping table 117T) and the second table processing operation (e.g., storing the temporary P2L address mapping table 117T into the NV memory 120), clearing the temporary P2L address mapping table 117T (e.g., the P2L table entries therein), for reusing the temporary P2L address mapping table 117T and/or the corresponding storage space in the RAM 116;

but the present invention is not limited thereto. According to some embodiments, the first table processing operation may comprise loading a certain local L2P address mapping table (e.g., the first local L2P address mapping table) within the global L2P address mapping table 120T into the RAM 116 to be the temporary L2P address mapping table 116T, updating one or more L2P table entries in the temporary L2P address mapping table 116T to indicate one or more L2P address mapping relationships among the L2P address mapping relationships regarding the active block 220, and updating the global L2P address mapping table 120T (e.g., this local L2P address mapping table therein) according to the temporary L2P address mapping table 116T.

After any active block (e.g., the active block 220) among the aforementioned at least one active block is fully programmed, the memory device 100 (e.g., the memory controller 110) may close the aforementioned any active block to make the aforementioned any active block become an inactive block, and select a blank block (e.g., an erased block) to be a replacement of the aforementioned any active block, for performing subsequent data reception corresponding to the aforementioned any active block. In addition, the subsequent processing mentioned above may comprise performing a GC procedure to write valid data among all data in the inactive block into another blank block (e.g., another erased block), but the present invention is not limited thereto.

According to some embodiments, as the P2L address mapping relationships indicated by the P2L table entries in the aforementioned at least one P2L address mapping table (e.g., the temporary P2L address mapping table 117T or the P2L address mapping table 227T) and the L2P address mapping relationships indicated by the associated L2P table entries in the L2P address mapping table 120T are supposed to be inverse address mapping relationships of each other, the memory controller 110 may determine the latest mapping information (e.g., physical addresses) carried by the associated L2P table entries in the L2P address mapping table 120T according to the latest mapping information (e.g., logical addresses) carried by the P2L table entries in the aforementioned at least one P2L address mapping table.

According to some embodiments, the memory controller 110 may operate according to one or more control schemes to perform internal management of the memory device 100, and more particularly, to generate and update a valid page count (VPC) table, for recording the VPCs of the plurality of blocks, but the present invention is not limited thereto. According to some embodiments, the active block 220 may be implemented by way of a superblock XB among multiple superblocks {XB} (e.g., the superblocks {XB(0), XB(1), . . . }). In this situation, the VPCs in the VPC table may represent the valid superpage (or super-page) count of the multiple superblocks {XB}.

For example, the plurality of NV memory elements 122-1, 122-2, . . . , and 122-N may be implemented as the plurality of flash memory chips such as the chips #0 and #1 or the plurality of flash memory dies such as the dies #0 and #1, respectively, where the plurality of NV memory elements 122-1, 122-2, . . . , and 122-N may comprise at least two memory elements 122-1 and 122-2, and the memory element count CNT_m of the plurality of NV memory elements 122-1, 122-2, . . . , and 122-N (e.g., the chip count of the plurality of flash memory chips or the die count of the plurality of flash memory dies) may vary, depending on different configurations of the NV memory 120. The aforementioned any NV memory element 122-n within the NV memory elements 122-1, 122-2, . . . , and 122-N may comprise multiple planes such as the planes #0 and #1, any plane among the multiple planes may comprise its own blocks {BLK(0), BLK(1), . . . }, and any block BLK( ) among the blocks {BLK(0), BLK(1), . . . } may comprise its own pages {Page(0), Page(1), . . . }. The memory controller 110 may combine multiple sets of corresponding blocks {{BLK(0)}, {BLK(1)}, . . . } in all planes (e.g., the planes #0 and #1) of all NV memory elements into the superblocks {XB(0), XB(1), . . . }, respectively, and combine multiple sets of corresponding pages {{Page(0)}, {Page(1)}, . . . } in all planes of all NV memory elements into the superpages {XP(0), XP(1), . . . }, respectively. In addition, the memory controller 110 may access (e.g., read or write) a set of corresponding blocks {BLK(r0)} of the superblock XB(r0) according to the physical block address (PBA) XBlk(r0), and more particularly, access a set of corresponding pages {Page (r1)} of the superpage XP (r1) in the superblock XB(r0) according to the PBA XBlk(r0) and the physical page address (PPA) XPg(r1), where "r0" and "r1" may be non-negative integers.

Figure 3:
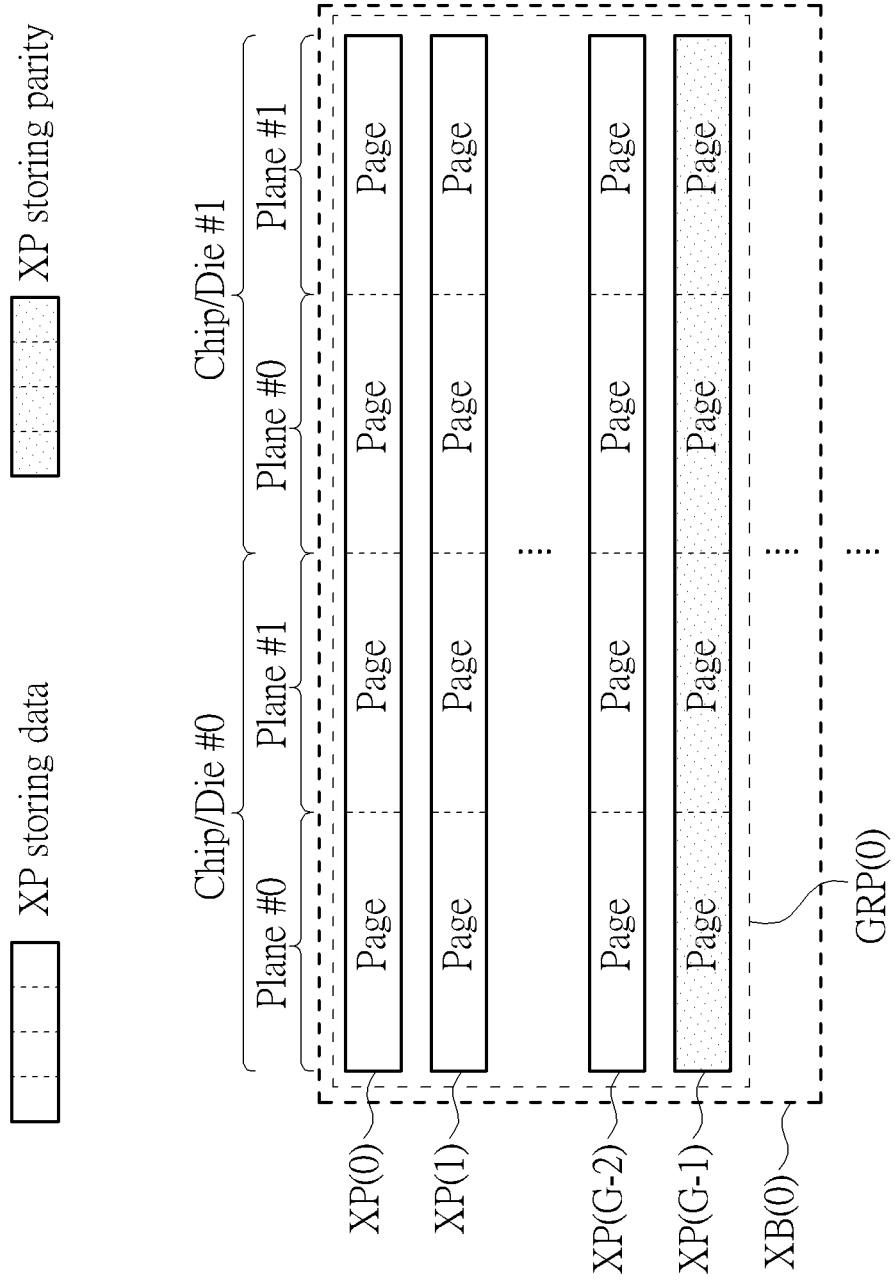
FIG. 3 illustrates a protection control scheme of a method for performing data access management of a memory device in a predetermined communications architecture to enhance SPOR of page-group-based RAID protection with aid of suspendible serial number according to an embodiment of the present invention.

FIG. 3 illustrates a protection control scheme of a method for performing data access management of a memory device such as the memory device 100 in a predetermined communications architecture (e.g., a UFS communications architecture) to enhance SPOR of page-group-based RAID protection with aid of suspendible serial number according to an embodiment of the present invention. The memory controller 110 may use the superblock XB (e.g., the superblock XB(0)) as the active block 220 to receive and store the host-write data into the page groups {GRP} (e.g., the page groups {GRP(0), GRP(1), . . . }) in the superblock XB, each page group GRP among the page groups {GRP} may comprise G superpages {XP}, and the first (G−1) superpages and the last superpage of the G superpages {XP} may be arranged to store data (e.g., partial data of the host-write data) and a parity (e.g., a parity code) of the data, respectively, where the parameter G may be a positive integer greater than one, and may be used for indicating the superpage count per page group. For example, the page group GRP(0) may comprise the superpages {XP(0), XP(1), . . . , XP(G−2), XP(G−1)}, the page group GRP(1) may comprise the superpages {XP(G), XP(G+1), . . . , XP((2*G)−2), XP((2*G)−1)}, and the rest may be deduced by analogy. In the embodiment shown in FIG. 3, the memory element count CNT_m (e.g., the chip count or the die count) may be equal to two, and the plane count CNT_p of the multiple planes in the NV memory element 122-n may be equal to two, but the present invention is not limited thereto. According to some embodiments, the memory element count CNT_m and/or the plane count CNT_p may vary.

Figure 4:
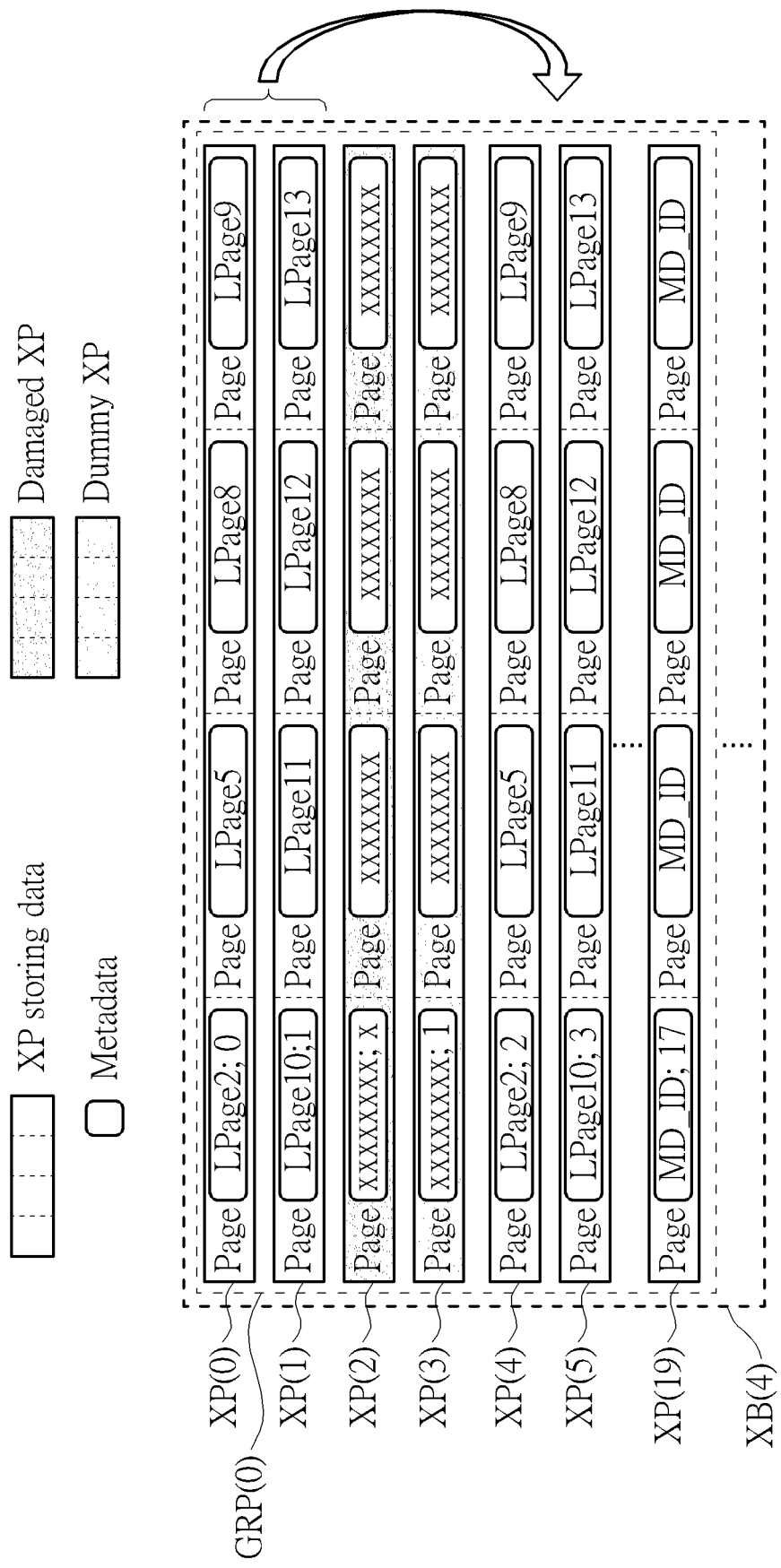
FIG. 4 illustrates a recovery control scheme of the method according to an embodiment of the present invention.

FIG. 4 illustrates a recovery control scheme of the method according to an embodiment of the present invention. Under control of the processing circuit such as the microprocessor 112, the memory controller 110 may perform data access management of the memory device 100 in the predetermined communications architecture according to the method, and more particularly, operate according to the protection control scheme, the recovery control scheme, etc. of the method to enhance the SPOR of the page-group-based RAID protection with the aid of suspendible serial number. For example, the memory controller 110 may have started writing the host-write data and carrying serial numbers {SN} in the metadata for being stored in corresponding superpages {XP}, and after occurrence of a SPO event, the memory controller 110 may perform a SPOR procedure in response to the SPO event, and temporarily prevent the serial number SN from varying. After performing the SPOR procedure in response to the SPO event, the memory controller 110 may continue writing the host-write data and carrying serial numbers {SN} in the metadata for being stored in corresponding superpages {XP}.

The memory controller 110 may write the host-write data and the corresponding metadata into the physical pages in the active block 220, respectively, where the metadata of the data stored in any physical page among the physical pages may comprise the logical address of the data stored in the aforementioned any physical page. Taking the architecture shown in FIG. 4 as an example, before the SPO event, the memory controller 110 may write first data of the logical addresses {LPage2, LPage5, LPage8, LPage9} among the host-write data and first metadata of the first data into the superpage XP(0), to make the first metadata carry the logical addresses {LPage2, LPage5, LPage8, LPage9} and make the metadata in the first page of the superpage XP(0) carry the serial number SN(0) (e.g., 0). Afterward, the memory controller 110 may write second data of the logical addresses {LPage10, LPage11, LPage12, LPage13} among the host-write data and second metadata of the second data into the superpage XP(1), to make the second metadata carry the logical addresses {LPage10, LPage11, LPage12, LPage13} and make the metadata in the first page of the superpage XP(1) carry the serial number SN(1) (e.g., 1), but fail to correctly write any data and any metadata into the superpage XP(2) due to the SPO event. After the SPO event, the memory controller 110 may perform the SPOR procedure to write dummy data and other metadata into the superpage XP(3), to make the metadata in the first page of the superpage XP(3) carry a suspended serial number SN(3) which is equal to the serial number SN(1) (e.g., 1). During performing the SPOR procedure, before writing the dummy data and the other metadata into the superpage XP(3), the memory controller 110 may back up the first data and the first metadata from the superpage XP(0) into at least one other block among the plurality of blocks to be their backup versions in advance, for being read afterward to generate third data and third metadata of the third data to be written into the superpage XP(4), respectively, and back up the second data and the second metadata from the superpage XP(1) into the aforementioned at least one other block to be their backup versions in advance, for being read afterward to generate fourth data and fourth metadata of the fourth data to be written into the superpage XP(5), respectively. For example, the memory controller 110 may write the third data and the third metadata into the superpage XP(4), to make the third metadata carry the logical addresses {LPage2, LPage5, LPage8, LPage9} and make the metadata in the first page of the superpage XP(4) carry the serial number SN(4) (e.g., 2), where the third data and the third metadata may be equal to the first data and the first metadata, respectively, except that the serial number SN(0) may be replaced with the serial number SN(4) by the memory controller 110, for being carried by the metadata in the first page of the superpage XP(4). For another example, the memory controller 110 may write the fourth data and the fourth metadata into the superpage XP(5), to make the fourth metadata carry the logical addresses {LPage10, LPage11, LPage12, LPage13} and make the metadata in the first page of the superpage XP(5) carry the serial number SN(5) (e.g., 3), where the fourth data and fourth metadata may be equal to the second data and the second metadata, respectively, except that the serial number SN(1) may be replaced with the serial number SN(5) by the memory controller 110, for being carried by the metadata in the first page of the superpage XP(5). In addition, as the superpage XP(2) is damaged, no metadata can be correctly read out from the pages of the superpage XP(2) (labeled "xxxxxxxx" for brevity), and no serial number SN(2) can be correctly read out from the first page of the superpage XP(2) (labeled "x" for brevity). Additionally, as the superpage XP(3) is written as a dummy superpage, the memory controller 110 may simply write the dummy data into the pages of the superpage XP(3), having no need to write more metadata (labeled "xxxxxxxx" for brevity). According to some embodiments, as long as implementation of the method will not be hindered, the memory controller 110 may skip carrying the logical address in the metadata.

According to the embodiment shown in FIG. 4, the metadata in the aforementioned any physical page may be arranged to carry the logical address of a logical storage unit of the host device 50, such as any logical address among the logical addresses {LPage2, LPage5, LPage8, LPage9} and {LPage10, LPage11, LPage12, LPage13}, for indicating that the aforementioned any physical page stores the data of the logical storage unit, but the present invention is not limited thereto. According to some embodiments, the metadata in the aforementioned any physical page may be arranged to carry at least one logical address of at least one logical storage unit of the host device 50, for indicating that the aforementioned any physical page stores the data of the aforementioned at least one logical storage unit. More particularly, the aforementioned any physical page may be large enough to store data of multiple logical storage units (e.g., multiple logical blocks) of the host device 50, and the metadata in the aforementioned any physical page may be arranged to carry multiple logical addresses (e.g., multiple logical block addresses (LBAs)) of the multiple logical storage units, for indicating that the aforementioned any physical page stores the data of the multiple logical storage units. For example, the data size of a logical storage unit among the multiple logical storage units may be equal to 4 kilobytes (KB), and the total data size of the multiple logical storage units may be equal to 16 KB. In this situation, the metadata in the aforementioned any physical page may be arranged to carry four logical addresses (e.g., four LBAs) of four logical storage units (e.g., four logical blocks), for indicating that the aforementioned any physical page stores the data of the four logical storage units. For brevity, similar descriptions for these embodiments are not repeated in detail here.

Further details regarding RAID encoding may be described as follows. According to some embodiments, at a certain moment during receiving and storing the host-write data into the active block 220, the memory controller 110 may be receiving and storing the host-write data into a current page group GRP of the page groups {GRP} in the active block 220. During receiving and storing the host-write data into the current page group GRP, the memory controller 110 may utilize the RAID circuit 115R to generate and update a parity PRT of the data stored in one or more sets of non-damaged and non-dummy pages (e.g., the pages of one or more non-damaged and non-dummy superpages {XP}), such as a bitwise exclusive OR (XOR) result of the data, for protecting the one or more sets of non-damaged and non-dummy pages and preparing for completing the RAID encoding of the current page group GRP. For example, the parity PRT may be regarded as a RAID parity. The memory controller 110 may temporarily store the parity PRT such as the bitwise XOR result in a parity region 116R within the RAM 116, and update the parity PRT as the number of the one or more sets of non-damaged and non-dummy pages increases, and more particularly, update the parity PRT as a written-page count WPC (e.g., the number of written pages) of the current page group GRP increases, where the written-page count WPC may be counted according to all pages of the current page group GRP that have been written, no matter whether there is any damaged page or any dummy page in the current page group GRP. When the written-page count WPC reaches a predetermined page count WPC1, the memory controller 110 may write the latest parity PRT (e.g., the latest version of the parity PRT in the RAM 116) into a set of parity pages (e.g., the pages of the last superpage XP) of the current page group GRP, in order to complete writing of the current page group GRP, for protecting the data. The written-page count WPC and the predetermined page count WPC1 may be measured in unit of superpage, where WPC1=(G−1), but the present invention is not limited thereto.

In addition, when no SPO event occurs during writing the current page group GRP, the memory controller 110 may generate the parity PRT(WPC) of the superpages {XP(0), . . . , XP(WPC)} according to the data of the superpage XP(WPC) and the parity PRT(WPC−1) of the superpages {XP(0), . . . , XP(WPC−1)}, and more particularly, perform a bitwise XOR operation on the data of the superpage XP(WPC) and the parity PRT(WPC−1) to generate a bitwise XOR result to be the parity PRT(WPC). When the SPO event occurs during writing the current page group GRP, the memory controller 110 may skip the RAID encoding of any damaged or dummy superpage XP(WPC_d) and maintain the parity PRT(WPC_d) to be equal to the parity PRT(WPC_d−1), and generate the parity PRT(WPC) as usual for other superpages {XP} in the current page group GRP, for example, by performing a bitwise XOR operation on the data of the superpage XP(WPC) and the parity PRT(WPC−1) to generate a bitwise XOR result to be the parity PRT(WPC).

Taking the page group GRP(0) shown in FIG. 4 as an example of the current page group GRP, when WPC=1, the memory controller 110 may have written the superpage XP(0) and may write the data of the superpage XP(0) into the RAM 116 to be the parity PRT(0) of the superpage XP(0); when WPC=2, the memory controller 110 may have written the superpages {XP(0), XP(1)} and may perform a bitwise XOR operation on the data of the superpage XP(1) and the parity PRT(0) to generate a bitwise XOR result to be the parity PRT(1) of the superpages {XP(0), XP(1)}; when WPC=3, the SPO event may occur at the time point t1, and the memory controller 110 may re-generate the parity PRT (1) according to the data read from the superpages {XP(0), XP(1)} in the SPOR procedure, to recover the parity PRT(1)

in the RAM 116 and maintain PRT (2)=PRT(1), where RAID encoding of the damaged superpage XP(2) should be skipped; when WPC=4, the memory controller 110 may write the dummy superpage XP(3) and maintain PRT (3)=PRT(2), where RAID encoding of the dummy superpage XP(3) should be skipped, as indicated by the suspended serial number SN(3) carried by the metadata in the first page of the superpage XP(3); when WPC=5, the memory controller 110 may have written the superpages {XP(0), . . . , XP(4)} (which may comprise the damaged superpage XP(2) and the dummy superpage XP(3)) and may perform a bitwise XOR operation on the data of the superpage XP(4) and the parity PRT(3) (e.g., PRT (3)=PRT (2)=PRT(1)) to generate a bitwise XOR result to be the parity PRT(4); when WPC=6, the memory controller 110 may have written the superpages {XP(0), . . . , XP(5)} (which may comprise the damaged superpage XP(2) and the dummy superpage XP(3)) and may perform a bitwise XOR operation on the data of the superpage XP(5) and the parity PRT(4) to generate a bitwise XOR result to be the parity PRT(5); and the rest may be deduced by analogy, for example, when WPC=WPC1, the memory controller 110 may have written the superpages {XP(0), . . . , XP(WPC1−1)} (which may comprise the damaged superpage XP(2) and the dummy superpage XP(3)) and may perform a bitwise XOR operation on the data of the superpage XP(WPC1−1) and the parity PRT(WPC1−2) to generate a bitwise XOR result to be the latest parity mentioned above, such as the parity PRT (WPC1−1). For better comprehension, assume that G=20, and the memory controller 110 may write the parity PRT(18) into the set of parity pages (e.g., the pages of the superpage XP(19)) of the page group GRP(0), to complete writing of the page group GRP(0). For brevity, similar descriptions for these embodiments are not repeated in detail here.

Figure 5:
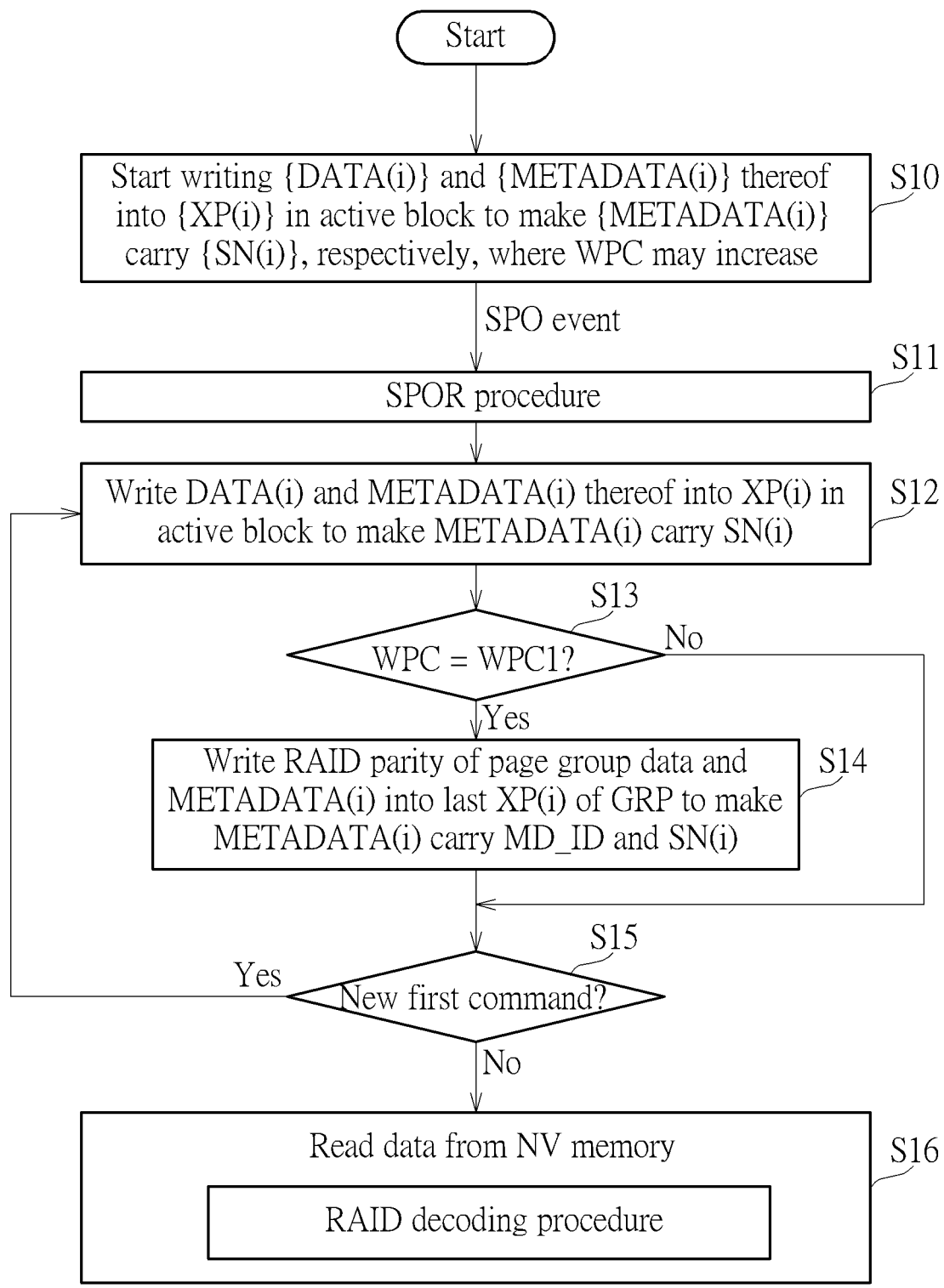
FIG. 5 illustrates a main working flow of the method according to an embodiment of the present invention.

FIG. 5 illustrates a main working flow of the method according to an embodiment of the present invention. The memory controller 110 may the active block 220 to receive and store at least one portion (e.g., a portion or all) of the host-write data into a current page group GRP with RAID-protection, where the current page group GRP may comprise G sets of pages in G superpages {XP}, such as (G* (CNT_m*CNT_p)) physical pages. For example, assuming that G=20, the memory controller 110 may use the superblock XB(4) as the active block 220 to receive and store the host-write data into the current page group GRP such as the page group GRP(0), and more particularly, may be receiving and storing a set of partial data into the superpage XP(2) at a time point t1, and the SPO event may occur at the time point t1. Before the occurrence of the SPO event, the memory controller 110 may write preceding data DATA(i) and metadata METADATA(i) of the preceding data DATA(i) into at least one preceding superpage XP(i) (or at least one set of preceding pages thereof) in the active block 220 to make the metadata METADATA(i) in the aforementioned at least one preceding superpage XP(i) carry at least one preceding serial number SN(i). After the occurrence of the SPO event, the memory controller 110 may perform the SPOR procedure, in which the current page group GRP may be regarded as a damaged page group GRP affected by the SPO event. During performing the SPOR procedure, the memory controller 110 may write the dummy data and other metadata METADATA(i) into at least one dummy superpage XP(i) (or at least one set of dummy pages thereof) in the active block 220 to make the other metadata METADATA(i) carry at least one suspended serial number SN(i) which is equal to the last serial number SN(i) among the aforementioned at least one preceding serial number SN(i), for indicating that RAID encoding of the aforementioned at least one dummy superpage XP(i) in the damaged page group GRP should be skipped, where the damaged page group GRP may comprise the aforementioned at least one preceding superpage XP(i) (or the aforementioned at least one set of preceding pages thereof).

In Step S10, before the time point t1, the memory controller 110 may start writing the data {DATA(i)} among the host-write data and the metadata {METADATA(i)} thereof into the superpages {XP(i)} in the active block 220 to make the metadata {METADATA(i)} carry the serial numbers {SN(i)}, respectively, where the serial numbers {SN(i)} respectively carried by the metadata {METADATA(i)} written in Step S10 are different from each other. As a result, the preceding data DATA(i) may comprise the data {DATA(0), DATA(1)}, the metadata METADATA(i) of the preceding data DATA(i) may comprise the metadata {METADATA(0), METADATA(1)}, the aforementioned at least one set of preceding pages in the aforementioned at least one preceding superpage XP(i) may comprise the two sets of (CNT_m*CNT_p) pages in the superpages {XP(0), XP(1)}, and the aforementioned at least one preceding serial number SN(i) carried by the metadata METADATA(i) in the aforementioned at least one preceding superpage XP(i) may comprise the serial numbers {SN(0), SN(1)} (e.g., {0, 1}). For example, when i=0, the memory controller 110 may write the data DATA(0) and the metadata METADATA(0) into a set of (CNT_m*CNT_p) pages (e.g., (2*2) pages) in the superpage XP(0) to make the metadata METADATA(0) carry the serial number SN(0) (e.g., 0); and when i=1, the memory controller 110 may write the data DATA(1) and the metadata METADATA(1) into a set of (CNT_m*CNT_p) pages (e.g., (2*2) pages) in the superpage XP(1) to make the metadata METADATA(1) carry the serial number SN(1) (e.g., 1). In addition, the memory controller 110 may write the data {DATA(0), DATA(1)} such as the first data and the second data into the superpages {XP(0), XP(1)} in response to a set of first commands from the host device 50, where the set of first commands may indicate that writing the data {DATA(0), DATA(1)} into the NV memory 120 is requested.

In Step S11, after the time point t1, the memory controller 110 may perform the SPOR procedure to process subsequent superpages XP(3), XP(4) and XP(5). As a result, the metadata METADATA(3) in the dummy superpage XP(3) may carry the suspended serial number SN(3) which is equal to the serial number SN(1) (e.g., 1), the metadata METADATA (4) in the superpage XP(4) may carry the serial number SN(4) (e.g., 2), and the metadata METADATA(5) in the superpage XP(5) may carry the serial number SN(5) (e.g., 3).

After performing the SPOR procedure in response to the SPO event, the memory controller 110 may write subsequent data DATA(i) and metadata METADATA(i) of the subsequent data DATA(i) into at least one set of subsequent pages (e.g., the pages of at least one subsequent superpage XP(i)) in the damaged page group GRP (e.g., the page group GRP(0)), to make the metadata METADATA(i) in the aforementioned at least one set of subsequent pages carry at least one subsequent serial number SN(i), where each serial number SN(i) among the aforementioned at least one subsequent serial number SN(i) may be different from the last serial number SN(i) among the aforementioned at least one preceding serial number SN(i), and more particularly, may be greater than the aforementioned at least one preceding serial number SN(i), but the present invention is not limited thereto. As shown in FIG. 5, the memory controller 110 may execute Step S12 one or more times in the loop comprising Steps S12-S15, to complete the operation of writing the subsequent data DATA(i) and the metadata METADATA(i) thereof into the aforementioned at least one set of subsequent pages.

In Step S12, the memory controller 110 may write the data DATA(i) among the host-write data and the metadata METADATA(i) thereof into the superpage XP(i) in the active block 220 to make the metadata METADATA(i) carry the serial number SN(i). In the loop comprising Steps S12-S15, the memory controller 110 may execute Step S12 multiple times to continue writing the data {DATA(i)} among the host-write data and the metadata {METADATA(i)} thereof into the superpages {XP(i)} in the active block 220 to make the metadata {METADATA(i)} carry the serial numbers {SN(i)}, respectively, where the serial numbers {SN(i)} respectively carried by the metadata {METADATA(i)} written in Step S12 are different from each other. As a result, the subsequent data DATA(i) may comprise the data {DATA(6), ..., DATA (G−2), the metadata METADATA(i) of the subsequent data DATA(i) may comprise the metadata {METADATA(6), ..., METADATA (G−2)}, the aforementioned at least one set of subsequent pages in the aforementioned at least one subsequent superpage XP(i) may comprise the (G−7) sets of (CNT_m*CNT_p) pages in the superpages {XP(6), ..., XP(G−2)}, and the aforementioned at least one subsequent serial number SN(i) carried by the metadata METADATA(i) in the aforementioned at least one subsequent superpage XP(i) may comprise the serial numbers {SN(6), ..., SN (G−2)} (e.g., {4, ..., (G−4)}). For example, when i=6, the memory controller 110 may write the data DATA(6) and the metadata METADATA(6) into a set of (CNT_m*CNT_p) pages (e.g., (2*2) pages) in the superpage XP(6) to make the metadata METADATA(6) carry the serial number SN(6) (e.g., 4); when i=7, the memory controller 110 may write the data DATA(7) and the metadata METADATA(7) into a set of (CNT_m*CNT_p) pages (e.g., (2*2) pages) in the superpage XP(7) to make the metadata METADATA(7) carry the serial number SN(7) (e.g., 5); and the rest may be deduced by analogy. In addition, the memory controller 110 may write the data {DATA(6), DATA(7), ..., DATA(18)} into the superpages {XP(6), XP(7), ..., XP(18)} in response to another set of first commands from the host device 50, where the other set of first commands may indicate that writing the data {DATA(6), DATA(7), ..., DATA(18)} into the NV memory 120 is requested, but the present invention is not limited thereto. For example, the memory controller 110 may write more subsequent data {DATA(i)} into more subsequent superpages {XP(i)} in response to the other set of first commands from the host device 50, where the other set of first commands may indicate that writing the more subsequent data {DATA(i)} into the NV memory 120 is requested.

In Step S13, the memory controller 110 may determine whether the written-page count WPC of the current page group GRP reaches the predetermined page count WPC1. If Yes (e.g., WPC=WPC1), Step S14 is entered; if No (e.g., WPC<WPC1), Step S15 is entered. The written-page count WPC and the predetermined page count WPC1 may be measured in unit of superpage, for example, when G=20, WPC1=(G−1)=19, but the present invention is not limited thereto. According to some embodiments, the written-page count WPC and the predetermined page count WPC1 may be measured in unit of physical page. For example, when G=20 and CNT_m=CNT_p=2, WPC1=((G−1)* (CNT_m*CNT_p))=(19*(2*2))=76.

In Step S14, the memory controller 110 may write a RAID parity of the page group data (e.g., the data {DATA(i)}) of the current page group GRP and the associated metadata METADATA(i) into the last superpage XP(i) of the current page group GRP, to make the metadata METADATA(i) carry at least one predetermined metadata identifier MD_ID and the serial number SN(i), where the page group data may comprise the data {DATA(i)} of the current page group GRP, and the last superpage XP(i) of the current page group GRP may comprise a set of (CNT_m*CNT_p) parity pages (e.g., (2*2) parity pages). More particularly, the current page group GRP may represent the page group GRP(0), and the memory controller 110 may write a RAID parity of the page group data of the page group GRP(0) into a set of (CNT_m*CNT_p) parity pages (e.g., (2*2) parity pages) in the last superpage XP(19) of the page group GRP(0), for protecting the page group data, where the page group data may comprise the data {DATA(i)} of the page group GRP (0), such as the data {DATA(0), DATA(1), DATA(4), DATA (5), ..., DATA(18)}. For example, the memory controller 110 may use the RAID circuit 115R to perform RAID encoding on the page group data of the current page group GRP (e.g., the page group GRP(0)) to generate the RAID parity thereof. In addition, the memory controller 110 may write the metadata METADATA(19) carrying the predetermined metadata identifier MD_ID into the set of (CNT_m*CNT_p) parity pages (e.g., (2*2) parity pages) in the last superpage XP(19), to make the metadata in the first page of the superpage XP(19) carry the serial number SN(19) (e.g., 17).

In Step S15, the memory controller 110 may determine whether any new first command (e.g., any write command) from the host device 50 is received. If Yes, Step S12 is entered; if No, Step S16 is entered.

In Step S16, in response to a set of second commands from the host device 50, the memory controller 110 may read stored data from the NV memory 120, where the set of second commands may indicate that reading the stored data from the NV memory 120 is requested. During the reading operation of Step S16, an uncorrectable error correction code (UECC) error of a target page group GRP_t may occur, and the memory controller 110 may perform an RAID decoding procedure.

For better comprehension, the method may be illustrated with the working flow shown in FIG. 5, but the present invention is not limited thereto. According to some embodiments, one or more steps may be added, deleted, or changed in the working flow shown in FIG. 5. For example, in a situation where no SPO event occurs, the memory controller 110 may skip performing the SPOR procedure, and perform the operation of Step S10 without being interrupted, where Step S11 may be omitted, and the operation of Steps S10 and S12 may be integrated into a same step such as Step S12. As a result, the memory controller 110 may process any page group GRP among the page groups {GRP} of the active block 220 in the loop comprising Steps S12-S15. For another example, assuming that multiple SPO events occur during writing the host-write data into the page groups {GRP} of the active block 220, respectively, the memory controller 110 may perform the operations of Steps S10-S15 for the aforementioned any page group GRP, where the arrow corresponding to the determination result "Yes" of Step S15 should be redirected to point toward Step S10. For yet another example, in a situation where no UECC error occurs, the memory controller 110 may read the stored data from the NV memory 120 directly, having no need to perform the RAID decoding procedure. For brevity, similar descriptions for these embodiments are not repeated in detail here.

According to some embodiments, the memory controller 110 may control the metadata METADATA(i) in the superpage XP(i) to carry the serial number SN(i) in the $j^{th}$ page of the superpage XP(i), where "i" may be a non-negative integer, and "j" may be a positive integer in the interval [1, (CNT_m*CNT_p)]. As a result, the metadata {METADATA(i)} may carry the serial numbers {SN(i)} in the $j^{th}$ pages of the superpages {XP(i)}, respectively. Taking the architecture shown in FIG. 4 as an example, j=1. For brevity, similar descriptions for these embodiments are not repeated in detail here.

According to some embodiments, the written-page count WPC and the predetermined page count WPC1 may be measured in unit of physical page, and more particularly, when CNT_m=CNT_p=1, each page group GRP among the page groups {GRP} may comprise G pages, such as the first (G–1) pages storing data and the last page storing the parity of the data, where the parameter G may indicate the page count per page group. For example, when G=20 and CNT_m=CNT_p=1, WPC1=((G–1)*(CNT_m*CNT_p))= (19*(1*1))=19. For brevity, similar descriptions for these embodiments are not repeated in detail here.

Figure 6:
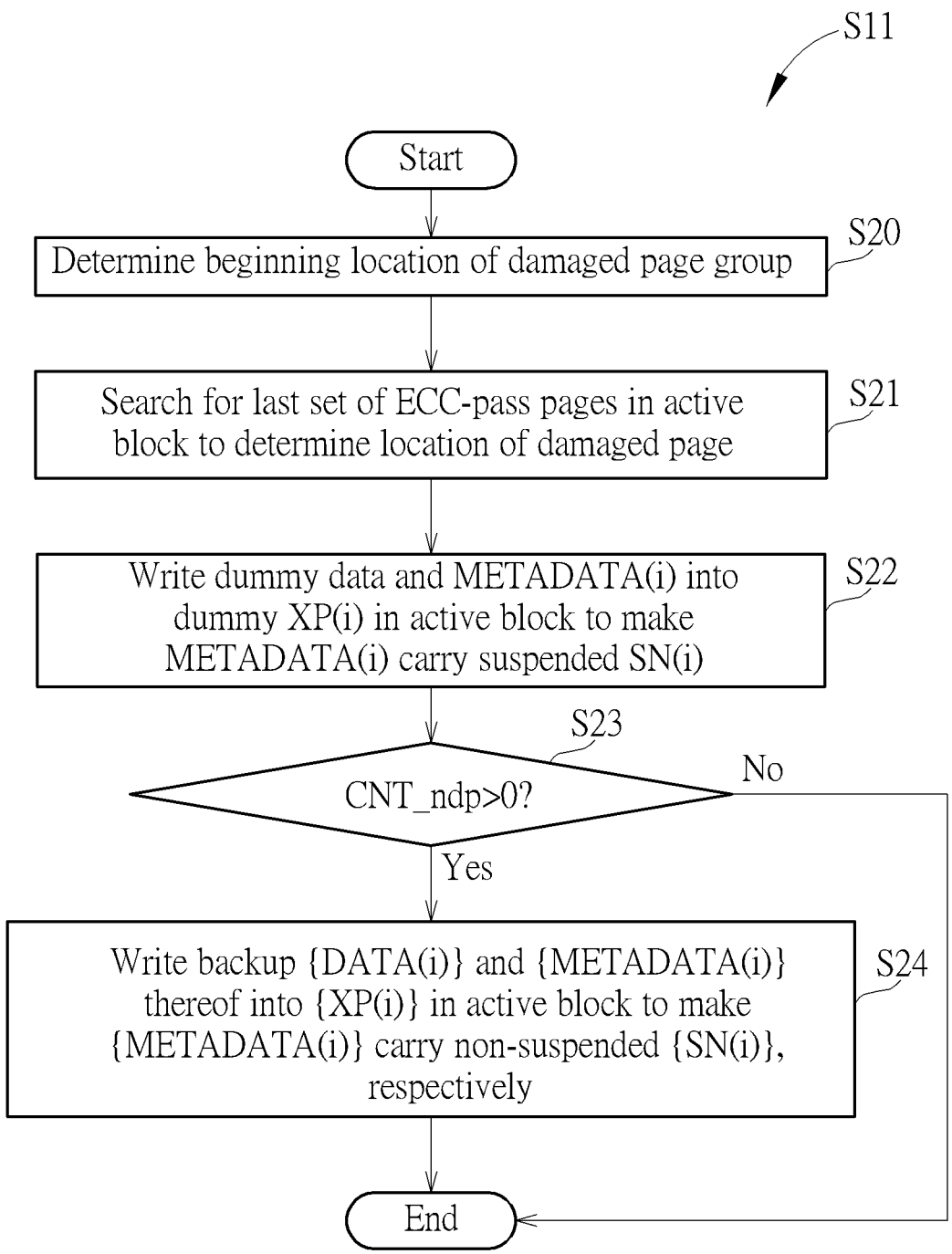
FIG. 6 illustrates the SPOR procedure of the main working flow shown in FIG. 5 according to an embodiment of the present invention.

FIG. 6 illustrates the SPOR procedure of the main working flow shown in FIG. 5 according to an embodiment of the present invention. For example, the SPOR procedure may comprise the operations of Steps S20-S24.

In Step S20, the memory controller 110 may determine which page group GRP in the active block 220 (e.g., the superblock XB(4) shown in FIG. 4) is the damaged page group GRP, and more particularly, determine the beginning location of the damaged page group GRP. For example, during receiving and storing the host-write data into the active block 220, the memory controller 110 may record and update a completed page group count CNT_cpg such as the number of completed page groups {GRP} (e.g., the page groups {GRP} comprising their own parity pages) that have been written into the active block 220, and store the completed page group count CNT_cpg into the NV memory 120, where the completed page group count CNT_cpg may be a non-negative integer. When executing Step S20, the memory controller 110 may determine the beginning location of the damaged page group GRP to be the superpage XP (CNT_cpg*G).

In Step S21, the memory controller 110 may search for the last set of ECC-pass pages in the active block 220 to determine the location of at least one set of damaged pages (e.g., the pages of the damaged superpage XP(2)). For example, the memory controller 110 may try reading one or more sets of pages (e.g., the pages of one or more superpages {XP}) in the damaged page group GRP, starting from the beginning location (or the first superpage XP) of the damaged page group GRP, to determine whether any UECC error occurs, and more particularly, back up any set of ECC-pass pages (e.g., the pages of any ECC-pass superpage XP) having no UECC error into another block among the plurality of blocks and try reading the next set of pages (e.g., the pages of the next superpages XP), until the aforementioned at least one set of damaged pages (e.g., the pages of the damaged superpage XP(2)) having the aforementioned any UECC error is found. In addition, the memory controller 110 may record and update a non-damaged-page count CNT_ndp for indicating the number of ECC-pass superpages {XP} found in the operation of Step S21, and may increase the non-damaged-page count CNT_ndp with an increment such as one when the aforementioned any ECC-pass superpage XP is found, where the non-damaged-page count CNT_ndp may have an initial value such as zero, and may be measured in unit of superpage, but the present invention is not limited thereto. According to some embodiments, the non-damaged-page count CNT_ndp may be measured in unit of physical page.

In Step S22, the memory controller 110 may write the dummy data and the other metadata METADATA(i) into the aforementioned at least one dummy superpage XP(i) to make the other metadata METADATA(i) carry the aforementioned at least one suspended serial number SN(i), and more particularly, write the dummy data and the metadata METADATA(3) into a set of (CNT_m*CNT_p) dummy pages (e.g., (2*2) dummy pages) in the dummy superpage XP(3), to make the metadata METADATA(3) carry the suspended serial number SN(3) which is equal to the serial number SN(1) (e.g., 1), for indicating that RAID encoding of the set of (CNT_m*CNT_p) dummy pages in the damaged page group GRP should be skipped. The memory controller 110 may write any set of dummy pages (e.g., the pages of the dummy superpage XP(3)) among the aforementioned at least one set of dummy pages into the active block 220 and try reading the aforementioned any set of dummy pages to determine whether any UECC error occurs. For example, if no UECC error occurs, which means the operation of Step S22 is completed, the memory controller 110 may prevent repeating the operations of writing the aforementioned any set of dummy pages and trying reading the aforementioned any set of dummy pages for any subsequent location (e.g., the location of the superpage XP(4)) in the damaged page group GRP, where the aforementioned at least one set of dummy pages may comprise a single set of dummy pages (e.g., the pages of the dummy superpage XP(3), as illustrated in FIG. 4); otherwise, the memory controller 110 may repeat these operations for a subsequent location (e.g., the location of the superpage XP(4)) in the damaged page group GRP until no UECC error occurs, where the aforementioned at least one set of dummy pages may comprise two or more sets of dummy pages, such as the pages of the superpages XP(3), XP(4), etc.

In Step S23, the memory controller 110 may determine whether the non-damaged-page count CNT_ndp is greater than zero. If Yes, Step S24 is entered; if No, the working flow shown in FIG. 6 comes to the end. The memory controller 110 may determine whether at least one set of first non-damaged pages (e.g., the pages of the aforementioned any ECC-pass superpage XP) exists in the damaged page group GRP during executing Step S21. For example, for the case that the aforementioned any ECC-pass superpage XP is found in the operation of Step S21, the aforementioned at least one set of first non-damaged pages such as the pages of the ECC-pass superpages {XP} (e.g., the pages of the non-damaged superpages XP(0) and XP(1)) may have been backed up into the other block by the memory controller 110, and the backup data thereof may be protected in the other block to prevent any possible data loss due to the operation of Step S22. Taking the page group GRP(0) shown in FIG. 4 as an example of the damaged page group GRP, the backup data of the aforementioned at least one set of first non-damaged pages may comprise the backup data DATA (0), the backup metadata METADATA(0), the backup data DATA(1) and the backup metadata METADATA(1), where the backup data DATA(0) and the backup metadata METADATA(0) may be equal to the data DATA(0) and the metadata METADATA(0) that are originally stored in the superpage XP(0), respectively, and the backup data DATA (1) and the backup metadata METADATA(1) may be equal to the data DATA(1) and the metadata METADATA(1) that are originally stored in the superpage XP(1), respectively.

In Step S24, when CNT_ndp>0, the memory controller 110 may write backup data {DATA(i)} and the metadata {METADATA(i)} thereof into the superpages {XP(i)} in the active block 220 to make the metadata {METADATA(i)} carry non-suspended serial numbers {SN(i)}, respectively. As a result, the memory controller 110 may write the backup data of the aforementioned at least one set of first non-damaged pages into the active block 220 such as the superblock XB(4) to generate at least one set of second non-damaged pages (e.g., the pages of the superpages XP(4) and XP(5)), for being protected by a set of parity pages (e.g., the pages of the superpage XP(G-1) in the superblock XB(4)) after the RAID encoding of the damaged page group GRP (e.g., the page group GRP(0)) is completed. For example, the damaged page group GRP may represent the page group GRP(0) shown in FIG. 4. In this situation, when i=4, the memory controller 110 may read the backup data DATA(0) and the backup metadata METADATA(0) from the other block to be the backup data DATA(4) and the metadata METADATA(4) thereof, respectively, change the serial number SN(0) carried by the metadata METADATA(4) to be the serial number SN(2), and write the backup data DATA(4) and the metadata METADATA(4) into a set of (CNT_m*CNT_p) pages (e.g., (2*2) pages) in the superpage XP(4) to make the metadata METADATA(4) carry the serial number SN(4) (e.g., 2); and when i=5, the memory controller 110 may read the backup data DATA(1) and the backup metadata METADATA(1) from the other block to be the backup data DATA(5) and the metadata METADATA(5) thereof, respectively, change the serial number SN(1) carried by the metadata METADATA(5) to be the serial number SN(3), and write the backup data DATA(5) and the metadata METADATA(5) into a set of (CNT_m*CNT_p) pages (e.g., (2*2) pages) in the superpage XP(5) to make the metadata METADATA(5) carry the serial number SN(5) (e.g., 3).

For better comprehension, the SPOR procedure may be illustrated with the working flow shown in FIG. 6, but the present invention is not limited thereto. According to some embodiments, one or more steps may be added, deleted, or changed in the working flow shown in FIG. 6.

Figure 7:
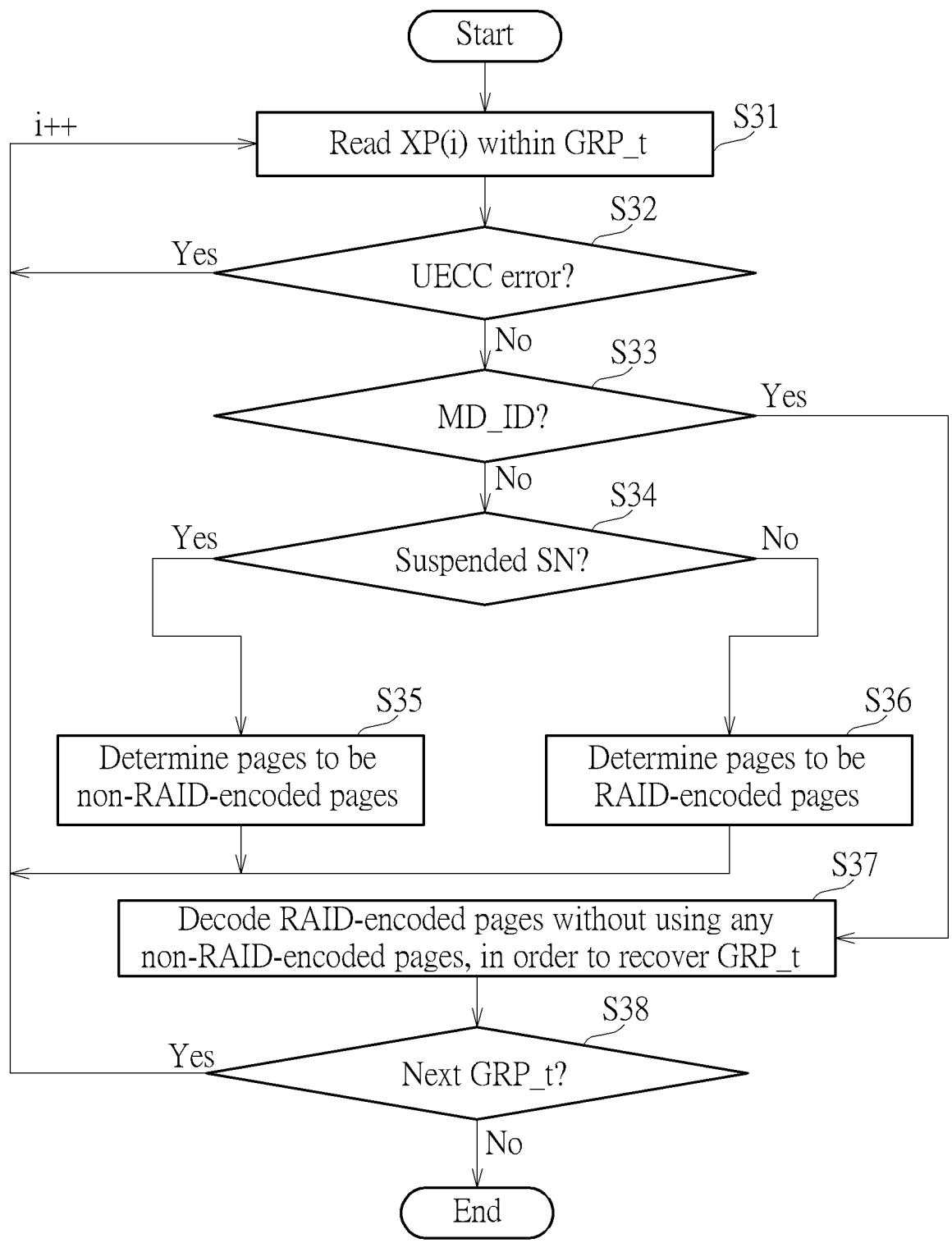
FIG. 7 illustrates some implementation details related to the RAID decoding procedure in the main working flow shown in FIG. 5 according to an embodiment of the present invention.

FIG. 7 illustrates some implementation details related to the RAID decoding procedure in the main working flow shown in FIG. 5 according to an embodiment of the present invention. In response to the occurrence of the UECC error of the target page group GRP_t, the memory controller 110 may perform associated operations in the RAID decoding procedure, where the RAID decoding procedure may comprise the operations of Steps S31-S38, but the present invention is not limited thereto. According to some embodiments, the RAID decoding procedure may vary. For example, the memory controller 110 may read multiple sets of pages in the target page group GRP_t, such as multiple sets of (CNT_m*CNT_p) pages in the superpages {XP(i)} within the target page group GRP_t, and determine whether the metadata METADATA(i) read from a set of (CNT_m*CNT_p) pages in the superpage XP(i) carries any suspended serial number SN, for performing selection of the pages to be decoded, where the any suspended serial number SN may represent any serial number SN(i) which is equal to a previous serial number SN carried by previous metadata METADATA read from a set of previous pages among the multiple sets of pages. As a result, the memory controller 110 may decode at least one portion of pages among the multiple sets of pages without using any non-RAID-encoded pages, in order to recover the target page group GRP_t. In addition, the target page group GRP_t may represent a certain page group GRP storing data among all page groups {GRP} of a superblock XB.

In Step S31, the memory controller 110 may read the superpage XP(i) within the target page group GRP_t, and more particularly, read a set of (CNT_m*CNT_p) pages (e.g., (2*2) pages) in the superpage XP(i) within the target page group GRP_t. For example, when executing Step S31 the first time during processing the target page group GRP_t, the memory controller 110 may read the beginning superpage XP(i) within the target page group GRP_t; and when executing Step S31 another time during processing the target page group GRP_t, the memory controller 110 may read a subsequent superpage XP(i) within the target page group GRP_t.

In Step S32, the memory controller 110 may determine whether the UECC error occurs in the superpage XP(i). If Yes, Step S31 is re-entered to read the next superpage XP, where the index i may be increased with a predetermined increment of one (labeled "i++" for brevity); if No, Step S33 is entered.

In Step S33, the memory controller 110 may determine whether the metadata METADATA(i) read from the superpage XP(i) (or the set of (CNT_m*CNT_p) pages therein) carries the predetermined metadata identifier MD_ID. If Yes, Step S37 is entered; if No, Step S34 is entered.

In Step S34, the memory controller 110 may determine whether the metadata METADATA(i) read from the superpage XP(i) (or the set of (CNT_m*CNT_p) pages therein) carries any suspended serial number SN. If Yes, Step S35 is entered; if No, Step S36 is entered.

In Step S35, the memory controller 110 may determine the set of (CNT_m*CNT_p) pages in the superpage XP(i) to be a set of non-RAID-encoded pages, where the set of non-RAID-encoded pages may represent a set of pages that are not involved with the RAID encoding of the target page group GRP_t, such as a set of pages that are not used in the calculation for generating the RAID parity of the target page group GRP_t. For example, the target page group GRP_t may represent the page group GRP(0) shown in FIG. 4. In this situation, when i=3, the memory controller 110 may determine the set of (CNT_m*CNT_p) pages (e.g., (2*2) pages) in the dummy superpage XP(3) to be the set of non-RAID-encoded pages.

In Step S36, the memory controller 110 may determine the set of (CNT_m*CNT_p) pages in the superpage XP(i) to be a set of RAID-encoded pages, where the set of RAID-encoded pages may represent a set of pages that are involved with the RAID encoding of the target page group GRP_t, such as a set of pages that are used in the calculation for generating the RAID parity of the target page group GRP_t. For example, the target page group GRP_t may represent the page group GRP(0) shown in FIG. 4. In this situation, when i=4, the memory controller 110 may determine the set of (CNT_m*CNT_p) pages (e.g., (2*2) pages) in the dummy superpage XP(4) to be the set of non-RAID-encoded pages; and the rest may be deduced by analogy.

In Step S37, the memory controller 110 may use the RAID circuit 115R to decode a majority of pages among the multiple sets of pages, such as multiple sets of RAID-encoded pages, without using any non-RAID-encoded pages (e.g., the damaged superpage XP having the UECC error and the dummy superpage XP having the suspended serial number SN), in order to recover the target page group GRP_t. Taking the architecture shown in FIG. 4 as an example, the target page group GRP_t may represent the page group GRP(0) within the superblock XB(4), and the UECC error may be detected at a superpage among the superpages {XP(0), XP(1), XP(4), XP(5), ..., XP(19)}. In this situation, the memory controller 110 may utilize the RAID circuit 115R to perform RAID decoding on all superpages having no UECC error among the superpages {XP(0), XP(1), XP(4), XP(5), ..., XP(19)} in the page group GRP(0), without using the damaged superpage XP(2) and the dummy superpage XP(3) that are not involved with RAID encoding of the page group GRP(0), in order to recover the superpage having the UECC error. In addition, assuming that no more SPO event occurs during writing the host-write data into the superblock XB(4) shown in FIG. 4, the target page group GRP_t may represent a subsequent page group GRP such as one of the page group GRP(1), GRP(2), etc. When the UECC error is detected at a superpage XP in the subsequent page group GRP, the memory controller 110 may utilize the RAID circuit 115R to perform RAID decoding on all superpages {XP} having no UECC error in the subsequent page group GRP, except the superpage XP having the UECC error.

In Step S38, the memory controller 110 may determine whether processing a next target page group GRP_t is needed. If Yes, Step S31 is entered to read the next superpage XP; if No, the working flow shown in FIG. 7 comes to the end.

For better comprehension, the RAID decoding procedure may be illustrated with the working flow shown in FIG. 7, but the present invention is not limited thereto. According to some embodiments, one or more steps may be added, deleted, or changed in the working flow shown in FIG. 7. For example, the target page group GRP_t may represent the page group GRP(0) shown in FIG. 4, and the UECC error may be detected at the damaged superpage XP(2), where no serial number SN(2) can be correctly read out from the first page of the superpage XP(2), and RAID encoding of the damaged superpage XP(2) should have been skipped. In addition, the suspended serial number SN(3) carried by the metadata in the first page of the superpage XP(3) may indicate that RAID encoding of the dummy superpage XP(3) should have been skipped, may further indicate that there is the damaged superpage XP(2). According to the suspended serial number SN(3) carried by the metadata METADATA (3) in the superpage XP(3), the memory controller 110 may detect that the superpage XP(2) is a damaged superpage, and omit the UECC error at the damaged superpage XP(2) in response to this detection. For brevity, similar descriptions for these embodiments are not repeated in detail here.

In the embodiments shown in FIG. 6 and FIG. 7, a set of (CNT_m*CNT_p) pages as mentioned in some steps may comprise multiple physical pages in a superpage XP accessed by a PPA, but the present invention is not limited thereto. According to some embodiments, when CNT_m=CNT_p=1, the multiple physical pages may be replaced with a single physical page accessed by the PPA. For brevity, similar descriptions for these embodiments are not repeated in detail here.

According to some embodiments, the memory controller 110 may configure the serial numbers {SN(i)} of the active block 220 to be an increasing sequence, and more particularly, configure all non-suspended serial numbers {SN(i)} of the active block 220 to be a strictly increasing sequence such as an arithmetic sequence {0, 1, 2, ...}, but the present invention is not limited thereto. According to some embodiments, the memory controller 110 may configure the serial numbers {SN(i)} of the active block 220 to be a decreasing sequence, and more particularly, configure all non-suspended serial numbers {SN(i)} of the active block 220 to be a strictly decreasing sequence such as an arithmetic sequence {SN_Max, (SN_Max-1), (SN_Max-2), ..., 2, 1, 0}, where "SN_Max" may be a positive integer. As a result, each serial number SN(i) among the aforementioned at least one subsequent serial number SN(i) may be less than the aforementioned at least one preceding serial number SN(i). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data access management of a memory device in a predetermined communications architecture to enhance sudden power off recovery (SPOR) of page-group-based redundant array of independent disks (RAID) protection with aid of suspendible serial number, the method being applied to a memory controller of the memory device, the memory device comprising the memory controller and a non-volatile (NV) memory, the NV memory comprising at least one NV memory element, the at least one NV memory element comprising a plurality of blocks, the method comprising:

before occurrence of a sudden power off (SPO) event, utilizing the memory controller to write preceding data and metadata of the preceding data into at least one set of preceding pages in a first active block among the plurality of blocks to make the metadata in the at least one set of preceding pages carry at least one preceding serial number;

after occurrence of the SPO event, utilizing the memory controller to perform a SPOR procedure in response to the SPO event, wherein the SPOR procedure comprises:

determining a beginning location of a damaged page group; and writing dummy data and other metadata into at least one set of dummy pages in the first active block to make the other metadata carry at least one suspended serial number which is equal to a last serial number among the at least one preceding serial number, making the other metadata carry the at least one suspended serial number indicating that RAID encoding of the at least one set of dummy pages in the damaged page group should be skipped, wherein the damaged page group comprises the at least one set of preceding pages; and after performing the SPOR procedure in response to the SPO event, utilizing the memory controller to write subsequent data and metadata of the subsequent data into at least one set of subsequent pages in the damaged page group to make the metadata in the at least one set of subsequent pages carry at least one subsequent serial number, wherein each serial number among the at least one subsequent serial number is different from the last serial number among the at least one preceding serial number.

2. The method of claim 1, wherein said each serial number among the at least one subsequent serial number is greater than the at least one preceding serial number.

3. The method of claim 1, wherein before the occurrence of the SPO event, the memory controller is arranged to write first data and first metadata of the first data into a set of first pages in the first active block to make the first metadata carry a first serial number, and write second data and second metadata of the second data into a set of second pages in the first active block to make the second metadata carry a second serial number which is different from the first serial number, wherein the preceding data comprises the first data and the second data, and the at least one set of preceding pages comprise the set of first pages and the set of second pages.

4. The method of claim 3, wherein the SPOR procedure further comprises:
writing third data and third metadata of the third data into a set of third pages to make the third metadata carry a third serial number; and
writing fourth data and fourth metadata of the fourth data into a set of fourth pages to make the fourth metadata carry a fourth serial number which is different from the third serial number.

5. The method of claim 1, wherein the SPOR procedure further comprises:
determining whether at least one set of first non-damaged pages exists in the damaged page group, wherein the at least one set of preceding pages are detected to be the at least one set of first non-damaged pages;
in response to existence of the at least one set of first non-damaged pages in the damaged page group, writing data of the at least one set of first non-damaged pages into the first active block to generate at least one set of second non-damaged pages, the at least one set of second non-damaged pages for being protected by a set of parity pages after RAID encoding of the damaged page group is completed.

6. The method of claim 5, wherein writing the data of the at least one set of first non-damaged pages into the first active block to generate the at least one set of second non-damaged pages further comprises:
backing up the data of the at least one set of first non-damaged pages into another block among the plurality of blocks to be backup data of the at least one set of first non-damaged pages; and
writing the backup data of the at least one set of first non-damaged pages into the first active block to generate the at least one set of second non-damaged pages.

7. The method of claim 1, wherein the SPOR procedure further comprises:
searching for a last set of error correction code (ECC)-pass pages in the first active block to determine a location of at least one set of damaged pages.

8. The method of claim 7, wherein searching for the last set of ECC-pass pages in the first active block to determine the location of the at least one set of damaged pages further comprises:
reading one or more sets of pages in the damaged page group, starting from the beginning location of the damaged page group, to determine whether any uncorrectable error correction code (UECC) error occurs; and
backing up any set of ECC-pass pages having no UECC error into another block among the plurality of blocks and reading a next set of pages, until at least one set of pages having the any UECC error is found, the at least one set of damaged pages being equal to the at least one set of pages having the any UECC error.

9. The method of claim 1, wherein in response to occurrence of an uncorrectable error correction code (UECC) error of a target page group, the memory controller is arranged to perform a RAID decoding procedure, wherein the RAID decoding procedure comprises:
reading multiple sets of pages in the target page group, and determining whether metadata, the metadata read from a set of pages among the multiple sets of pages, carries a suspended serial number which is equal to a previous serial number carried by previous metadata read from a set of previous pages among the multiple sets of pages, to generate a determination result, the determination result indicating whether the metadata read from the set of pages carries the suspended serial number which is equal to the previous serial number;
according to the determination result indicating whether the metadata read from the set of pages carries the suspended serial number which is equal to the previous serial number, selectively determining the set of pages to be a set of non-RAID-encoded pages;
decoding at least one portion of pages among the multiple sets of pages without using any set of non-RAID-encoded pages, in order to recover the target page group.

10. The method of claim 9, wherein:
if the determination result indicates that the metadata read from the set of pages carries the suspended serial number which is equal to the previous serial number, the memory controller is arranged to determine the set of pages to be the set of non-RAID-encoded pages; and
if the determination result indicates that the metadata read from the set of pages does not carry the suspended serial number which is equal to the previous serial number, the memory controller is arranged to determine that the set of pages are a set of RAID-encoded pages, the set of RAID-encoded pages for being used during decoding the at least one portion of pages among the multiple sets of pages.

11. The method of claim 1, wherein writing the dummy data and the other metadata into the at least one set of dummy pages in the first active block to make the other metadata carry the suspended serial number which is equal to the last serial number among the at least one preceding serial number further comprises:
writing the dummy data and the other metadata into any set of dummy pages among the at least one set of dummy pages and reading the any set of dummy pages to determine whether any uncorrectable error correction code (UECC) error occurs;
if the any UECC error occurs, repeating operations of writing the dummy data and the other metadata into the any set of dummy pages and reading the any set of dummy pages for a subsequent location in the damaged page group until no UECC error occurs; and
if the any UECC error does not occur, preventing repeating the operations of writing the dummy data and the other metadata into the any set of dummy pages and reading the any set of dummy pages for any subsequent location in the damaged page group.

12. A memory controller of a memory device, the memory device comprising the memory controller and a non-volatile (NV) memory, the NV memory comprising at least one NV memory element, the at least one NV memory element comprising a plurality of blocks, the memory controller comprising:
a processing circuit, arranged to control the memory controller according to a plurality of host commands from a host device, to allow the host device to access the NV memory through the memory controller, wherein the processing circuit is arranged to perform data access management of the memory device in a predetermined communications architecture to enhance sudden power off recovery (SPOR) of page-group-based redundant array of independent disks (RAID) protection with aid of suspendible serial number;
wherein:
before occurrence of a sudden power off (SPO) event, the memory controller writes preceding data and metadata of the preceding data into at least one set of preceding pages in a first active block among the plurality of blocks to make the metadata in the at least one set of preceding pages carry at least one preceding serial number;
after occurrence of the SPO event, the memory controller performs a SPOR procedure in response to the SPO event, wherein the SPOR procedure comprises:
determining a beginning location of a damaged page group; and
writing dummy data and other metadata into at least one set of dummy pages in the first active block to make the other metadata carry at least one suspended serial number which is equal to a last serial number among the at least one preceding serial number, making the other metadata carry the at least one suspended serial number indicating that RAID encoding of the at least one set of dummy pages in the damaged page group should be skipped, wherein the damaged page group comprises the at least one set of preceding pages; and
after performing the SPOR procedure in response to the SPO event, the memory controller writes subsequent data and metadata of the subsequent data into at least one set of subsequent pages in the damaged page group to make the metadata in the at least one set of subsequent pages carry at least one subsequent serial number, wherein each serial number among the at least one subsequent serial number is different from the last serial number among the at least one preceding serial number.

13. The memory device comprising the memory controller of claim 12,
wherein the memory device comprises:
the NV memory, configured to store information; and
the memory controller, coupled to the NV memory, configured to control operations of the memory device.

14. An electronic device comprising the memory device of claim 13, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

* * * * *